US006292706B1

(12) United States Patent
Birch et al.

(10) Patent No.: US 6,292,706 B1
(45) Date of Patent: *Sep. 18, 2001

(54) SIMULATED BASEBALL GAME

(75) Inventors: Larry D. Birch, Lee's Summit, MO (US); Lawrence E. Judy, Omaha, NE (US); Harold W. Kuebler, Overland Park, KS (US)

(73) Assignee: William E. Welch, Chillicothe, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,034

(22) Filed: Apr. 17, 1998

(51) Int. Cl.$^7$ ................................................. G06F 155/00
(52) U.S. Cl. ................................. 700/91; 700/90; 700/92; 463/2; 463/3; 273/317.6
(58) Field of Search ................................. 700/91, 92, 90; 463/2, 3, 7, 37, 43; 273/317.6, 329, 118 R

(56) References Cited

U.S. PATENT DOCUMENTS

| | | | |
|---|---|---|---|
| 4,672,541 | * 6/1987 | Bromley et al. | 364/410 X |
| 4,918,603 | 4/1990 | Hughes et al. | |
| 4,977,503 | * 12/1990 | Rudnick et al. | 364/410 X |
| 5,026,058 | * 6/1991 | Bromley | 273/93 C X |
| 5,067,079 | * 11/1991 | Smith, III et al. | 364/410 X |
| 5,411,259 | * 5/1995 | Pearson et al. | 273/93 C X |
| 5,412,188 | * 5/1995 | Metz | 235/375 X |
| 5,435,554 | * 7/1995 | Lipson | 273/88 X |
| 5,462,275 | * 10/1995 | Lowe et al. | 273/94 X |
| 5,586,257 | * 12/1996 | Perlman | 463/42 |
| 5,664,778 | * 9/1997 | Kikuchi et al. | 273/148 B |
| 5,695,401 | * 12/1997 | Lowe et al. | 463/4 X |
| 5,743,801 | * 4/1998 | Welander | 463/44 |
| 5,769,713 | * 6/1998 | Katayama | 463/3 |
| 5,820,461 | * 10/1998 | Pernatozzi | 463/16 X |
| 5,820,463 | * 10/1998 | O'Callaghan | 463/42 |
| 5,890,906 | * 4/1999 | Macri et al. | 434/247 X |
| 5,935,005 | * 8/1999 | Tsuda et al. | 463/41 |

OTHER PUBLICATIONS

The 10th Man; Author: Bill Welch; 1989.
The Bars–Sega Book World Series Baseball All–Star Review; Author: Bill Welch w/ Jeff Moses; 1994.
B.A.R.S. Baseball Analysis & Reporting System; Author William E. Welch; 1971, 1975, 1984.
Baseball Analysis and Reporting System—American League Report (Ballpark Edition); Author: Bill Welch w/ Jeff Moses; 1989.
Baseball Analysis and Reporting System—American League Report (New Ballpark Edition); Author: Bill Welch w/Jeff Moses.
Baseball Analysis and Reporting System—National League Report (Ballpark Edition); Author: Bill Welch w/ Jeff Moses; 1989.

* cited by examiner

*Primary Examiner*—Jessica J. Harrison
*Assistant Examiner*—Binh-An D. Nguyen
(74) *Attorney, Agent, or Firm*—Hovey, Williams, Timmons & Collins

(57) ABSTRACT

A computer game simulates the playing of an athletic game such as a baseball game to its conclusion. In particular, the game simulates the sequential game play events and determines the outcomes of the events in accordance with historical or simulated data representative of the game playing characteristics of each team member under selected circumstances. The progress of the game is tracked in accordance with the outcomes through completion of the events to determine the winner of the athletic game and the score thereof.

38 Claims, 4 Drawing Sheets

Microfiche Appendix Included
(14 Microfiche, 933 Pages)

SIMULATED BASEBALL GAME

MICROFICHE APPENDIX

A microfiche appendix as Appendix 1 containing a source code of a computer program useful in accordance with the present invention is appended hereto as 14 sheets of microfiche containing 933 frames.

BACKGROUND OF THE INVENTION

1. Field of the Invention

The present invention relates to the field of computer games. In particular, the invention is concerned with a computer game that simulates the playing of an athletic game such as a baseball game to its conclusion.

2. Description of the Prior Art

The prior art discloses computer games that allow users to participate in the simulated playing of athletic games such as baseball, football, basketball, hockey and the like. In these prior art games, users make and enter decisions that affect the progress and ultimate winner of the game. In a computer baseball game, for example, a user might decide what type of pitch the pitcher throws or whether a base runner will attempt to steal.

These prior art computer games, however, do not lend themselves to serious simulation to determine the projected winner of an actual game. Moreover, the prior art games do not have sufficient detail concerning the game play characteristics of team members to determine the effect of a given team member on the ability of the team to compete. In other words, prior art games are designed to satisfy the objective of entertainment, not serious study and simulation of the athletic game itself.

SUMMARY OF THE INVENTION

The present invention solves the prior art problems mentioned above and provides a distinct advance in the state of the art. In particular, the invention hereof simulates the playing of an athletic game to its conclusion using detailed game playing characteristics of team members.

The preferred computer and computer programming of the present invention simulates the playing of an athletic game such as a baseball game to its conclusion. In particular, the game simulates the sequential game play events and determines the outcomes of the events in accordance with historical or simulated data representative of the game playing characteristics of each team member under selected circumstances. The progress of the game is tracked in accordance with the outcomes through completion of the events to determine the winner of the athletic game and the score thereof. Other preferred aspects of the present invention are disclosed herein.

DETAILED DESCRIPTION OF THE PREFERRED EMBODIMENT

Figure 1:
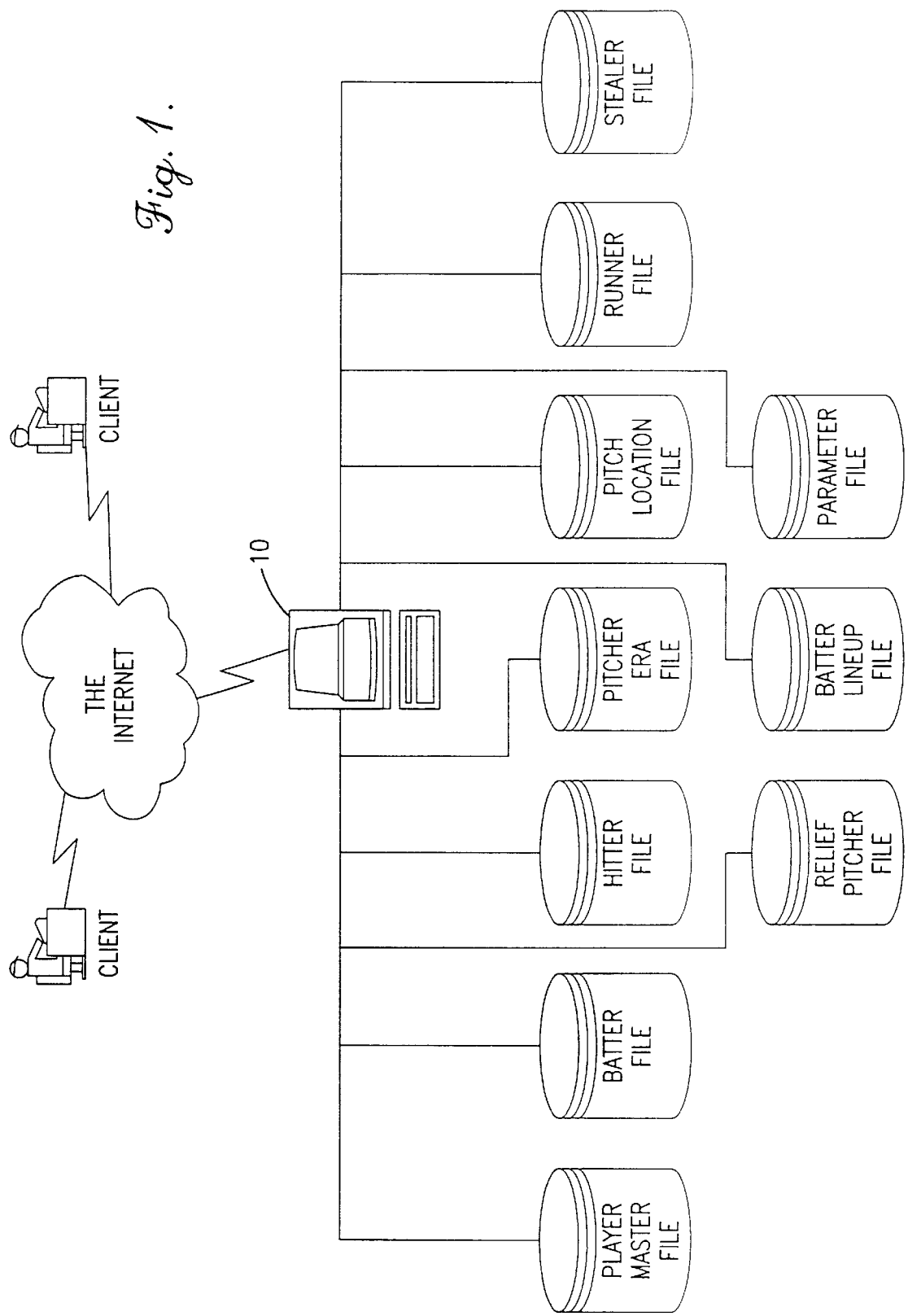
FIG. 1 is a schematic representation of the preferred game simulation computer in accordance with the present invention shown connected for user access by way of the internet and further illustrating the preferred data files used by the computer.

FIG. 1 illustrates preferred game simulation computer 10 in accordance with the present invention shown in use by clients or users with access by way of the internet. As will be appreciated, user access can be provided in other ways such as direct access to computer 10 by keyboard and mouse, or access by way of conventional networking such as a local area network.

In the preferred embodiment, computer 10 is a computer server such as a personal computer having a 133 MHZ Pentium microprocessor, 12 GB hard drive and 64 MB RAM using the OS2 operating system. Computer 10 is operated by the preferred game simulation program in accordance with the present invention shown on the attached microfiche appendix included as part of the disclosure hereof, and further illustrated by the computer program flow charts of FIGS. 2, 3A and 3B. As such, computer 10 is a special purpose computer for performing the athletic game simulation of the present invention.

The preferred embodiment of the present invention is the simulation of a baseball game. However, the present invention finds utility in other types of athletic games such as football, basketball, hockey or the like in which there can be a score and in which actual or simulated game playing characteristics of team members can be made available.

By way of introduction, the theory of computerized baseball in accordance with the present invention is that, by using a computer, it is possible to predict reasonably well the outcome of a future game based on what has happened in the past. As an example, the theory maintains it is possible to predict what pitches a hitter hits with the most regularity, the area to which it is hit, and with what authority, height and direction. In addition, even the type and location of a pitch can be anticipated for a given pitcher in a particular situation.

The simulation contains a detailed account of every significant event that occurs in a baseball game including each pitch and attempted steal as events. The simulation continues according to the rules of the game until completion of all of the events leading to the conclusion of the game. The outcome from each event is determined in accordance with the game playing characteristics of each team member under selected circumstances as described below in the individual team member records. Data has been recorded and is available for major league baseball games every year since 1984. The simulation of a game is based on past historical data and events that actually happened.

This game simulation of the invention keeps track of:

a) The exact location of every pitch. The simulation designates nine locations in and around the strike zone. This information allows each hitter's batting average to be calculated within each grid location. Also, a complete record can be kept of where each pitcher throws his pitches and whether those pitches place him ahead of, behind, or even in the count with the batter.

b) The type of pitch. The simulation tracks fastballs, curves, sliders, knuckleballs, screwballs, sinkerballs, split-finger fastballs and change-ups.

c) The results of every pitch. Called-strikes and swing-strikes, balls, fouls, walks, bunts, and bunt attempts, passed balls, balks, hit by pitch, intentional balls, interference, wild pitch, pitch off to first, stolen bases, sacrifices, accuracy of throws, whether the second baseman or shortstop covered second, etc.—all events in the game are being recorded on a pitch-by-pitch basis.

d) Exact details of the results of every hit. Records are maintained on each runner advanced, runs scored, runs driven in, errors, direction and distance the ball was hit, exactly where it landed on the field, who fielded the ball, etc.

e) Miscellaneous factors affecting the game. Also, the simulation takes into account the hand of both the pitcher and batter, the current number of outs, and other players currently on base, as well, for each pitch during the game. Even the playing time of the game, temperature, wind direction, wind speed, field condition and attendance are recorded.

To simulate a game, two teams are selected along with the starting pitchers for both teams, the batting lineup for both teams and the desired level of game results. From this point the computer simulates an entire game to its conclusion, pitch by pitch, detail by detail, all based on historical data.

The simulation is designed for multiple purposes, including but not limited to:

a) Allowing two individuals to compete against each other by each managing a team that is used in a simulation.

b) Allowing a single user to play in competition against the computer where the user would pick a team, the computer would pick a team, and a simulated game would be played.

c) A fantasy baseball league can be played where individuals would compete against other people in the league with the game results being simulated games. Since this league is not based on the real baseball season, it can be played year round.

d) Baseball managers or fantasy league players can use the simulation to determine the effects of moving a player from one team to another. After moving the player, the user can run multiple simulations to determine the effect a particular player has on the team's winning percentage.

e) Baseball managers or fantasy league players can also use the simulation to determine the effects of changing the batting lineup to determine what lineup produces the most runs over a series of multiple games.

DATA PREPARATION

Figure 2:
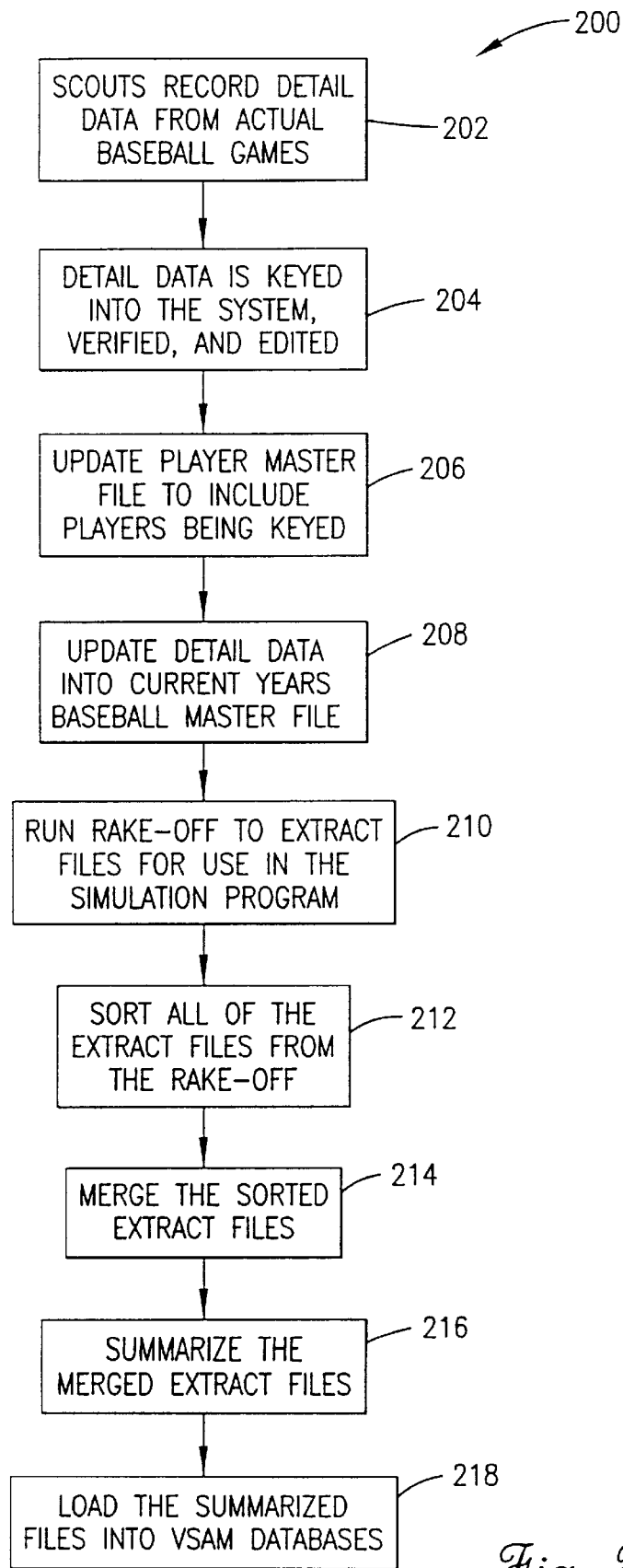
FIG. 2 is a flow chart illustrating the data gathering preparation steps for use in operating the computer of FIG. 1.

FIG. 2 illustrates the data preparation process 200 for gathering the historical data used in a game simulation Step 202—Scouts record detail data from actual baseball games. The scouts utilize two data entry sheet formats.

a) Format 1 is the game header information filled in once for each game and includes:
 Date of Game
 Stadium game is played in
 Field Condition
 Weather Condition
 Wind Direction
 Wind Speed
 Temperature
 Time of day game is played
 Double header (yes or no)
 Double header number if yes
 Opposing team number
 Attendance
 Final score of the game
 Batting lineup for both teams, specifying player's number, name, and
 position played;

b) Format 2 provides the pitch by pitch account of the game. Each sheet contains the detail data for all pitches thrown to an individual batter. Within the heading of this sheet the following in entered:
 Game date (mmddyy)
 Inning (t=top b=bottom and 1–15 for inning number)
 Pitcher player number
 Catcher player number
 Batter player number
 Sheet page number (00 I–xxx).

The body of the second format is used to record the pitch by pitch data for a single batter. It includes:
 Pitch number to this batter (1–15)
 Designated or Pinch hitter code (O=no or 1=yes)
 Number of outs in this inning (0–2)
 Base situation
  1=Runner on 1st
  2=Runner on 2nd
  3=Runner on 3rd
  4=Runners on 1st and 2nd
  5=Runners on 2nd and 3rd
  6=Runners on 1st and 3rd
  7=Runners on 1st, 2nd and 3rd
 Count
  Balls (0–3)
  Strikes (0–2)
 Type of pitch
  1=Fast ball
  2=Curve ball
  3=Slider ball
  4=Knuckle ball
  5=Screw ball
  6=Sinker ball
  7=Change-up/curve ball
  8=Intentional ball
  9=Change-up/fast ball
 Location of pitch
  1=High inside
  2=High over the middle
  3=High outside
  4=Medium inside
  5=Medium over the middle
  6=Medium outside
  7=Low inside
  8=Low over the middle
  9=Low outside
 Call of pitch
  1=Hit
  2=Foul
  3=Strike, swing
  4=Strike, no swing
  5=Ball
  6=Pitch-out
  7=Walk
  8=Ball
  9=Successful bunt
  0=Bunt attempt
  A=Hit by pitch
  B=Interference
  C=Wild pitch D=Pitch off to 1st E=Passed ball Angle from 1st base line that ball was hit (0–90 degrees from 1st base)

Initial distance ball was hit when it first touched ground (in feet)

Final distance ball rolled (in feet)

Position number of player who fielded the hit ball (1–9)

Type of hit

1=Ground ball

2=Line drive

3=Fly

Number of bases batter gained

0=No bases gained

1=1st base

2=2nd base

3=3rd base

4=Home run

Sacrifice hit bunt/fly (O=no, 1=yes)

Player's number if he scored from first (otherwise blank)

Player's number if he scored from second (otherwise blank)

Player's number if he scored from third (otherwise blank)

Player's number if batter scored from home (otherwise blank)

Position number of player committing an error

Base that ball was thrown to (0–4, where 0=did not throw to base)

Accuracy of throw (O=bad throw, 1=good throw)

Player number of runner, if he stole a base

Position number of player covering second (1–9)

Step 204—Enter detail data.

Information from the scouting reports and other sources is data entered onto a hard drive of computer 10, verified, and edited for accuracy.

Step 206—Update Player Master.

Validate and update the player master file stored on the hard drive of computer 10 to correspond to the scouting header batting lineup, adding any new players to the player master and moving players as appropriate from one team to another to reflect any trades that have occurred. When a player is added to the player master, they are assigned a unique serial key that will be permanently retained. The player master associates the serially assigned unique number with the players name and two position player number on his jersey, which is subject to change as the player is traded from team to team. In addition, the player file is used to keep track of the last 10 teams that the player has played on.

Step 208—Update detail data into current years baseball master file.

All detail data from the scouting reports that have been edited and verified are then used to update the baseball master file containing the accumulation of all games for that season. There is a baseball master file for each season. The detail records in the Baseball Master File present a pitch by pitch itemization of each game in the season.

Step 210—Process the Rake-off program to extract files for use in the simulation program.

The purpose of the "rake-off" program is to extract detailed data from each pitch and the resultant outcome of a play for every pitch thrown in every recorded game from each season. The data are summarized in various ways and then included in an explosion of details to augment the updating of a subsequent variety of databases following the rake-off.

The output detail records potentially resulting from each pitch are retained in their own separate output files. They are:

a) the pitch/location rake-off record, b) the batter rake-off record, c) the runner rake-off record, d) the stealer rake-off record, e) the player master rake-off record, and f) the relief pitcher rake-off record.

a) The pitch/location rake-off record is defined by:

the pitcher player number and hand (key field), the batter player number and hand (key field), the type of pitch thrown, the location of the pitch, the count on the batter, and the base situation.

b) The batter rake-off record is defined by:

the batter number and hand (key field), the pitcher number and hand (key field), the stadium code (key field), the type of pitch (key field), the location of the pitch, the call of the pitch, the type of hit, the quadrant to which the ball was hit, the bases gained, the count, and the base situation.

c) The runner rake-off record is defined by:

the runner player number (key field), the stadium code (key field), the quadrant code (key field), the general situation (key field), the hit type (key field), the base of origin of the runner, and the number of bases advanced from the base of origin.

d) The stealer rake-off record is defined by:

the stealer player number (key field), the pitcher player number (key field), the stadium code (key field), the number of outs (key field), the base of origin of the runner, and the stolen base flag code.

e) The player master rake-off record is defined by:

the player number (key field), the player hand batting code for this pitch, the time of day code, the stadium code, the time at bat code, the bimonthly third of the season the game played, and the hit code.

f) The relief pitcher rake-off record is defined by:

the relief pitcher player number (key field)

and the inning this pitcher was brought in.

In order to summarize the data within these rake-off records, the quadrant of any hit is calculated from it's angle and corresponding distance hit. This is then included in the output detail. The quadrants are sections of the baseball field numbered from 1 thru 28. Quadrants 1 thru 7 are defined as the pie shaped areas within the infield numbered from first base to third base in 12.85 degree "quadrants". Quadrants 8 thru 14 are those areas of the diamond radiating out from the first seven beyond the infield to a distance of 225 feet. Quadrants 15 thru 21 and 22 thru 28 are then, respectively, those areas extended another 75 feet out to 300 feet and those beyond 300 feet.

The ball/strike count on the batter is reduced to four codes as follows:

| Count | Count Code |
| --- | --- |
| 0 balls, 0 strikes = | 1 (even) |
| 0 balls, 1 strikes = | 2 (ahead) |
| 0 balls, 2 strikes = | 2 (ahead) |
| 1 ball, 0 strikes = | 1 (even) |
| 1 ball, 1 strike = | 2 (ahead) |
| 1 ball, 2 strikes = | 2 (ahead) |
| 2 balls, 0 strikes = | 3 (behind) |
| 2 balls, 1 strike = | 1 (even) |
| 2 balls, 2 strikes = | 2 (ahead) |
| 3 balls, 0 strikes = | 4 (way behind) |
| 3 balls, 1 strikes = | 3 (behind) |
| 3 balls, 2 strikes = | 1 (even) |

The base situation code is reduced to three codes as follows:
0=No one on base
1=Runner on 1st base
2=Runner on 2nd or 3rd in scoring position
   The stolen base flag contains:
   blank=runner on base with no advancement, "Y"=runner successfully stole a base, or "N"=runner attempted to steal a base (out).
   The time of day code is:
   "D"=a day game (started prior to 6 P.M.), or
   "N"=a night game, otherwise.
   The time-at-bat code is the number of the player's turn at bat this game.
   The bimonthly third of the season code is:
   1=game played in April or May,
   2=game played in June or July,
   or 3=game played in August or September.
   The hit code is:
   1=no hit on this time-at-bat or
   2=got a hit on this time-at-bat.

Data are summarized in a slightly different fashion for the runner detail in relationship to the outs and the hit types. The number of outs are meaningful to the runner only in the determination of whether there are no or only one outs, a code "1", or if there are two outs, a code "2". Likewise, the type hit is meaningful to the runner only whether the hit was a ground ball, a code "1", or a fly ball, a code "2". Also, the outs and base situation codes are concatenated into one, referred to here as the general situation, and considered as a key field.

Step 212—Sort all of the extracted files from the rake-off.

All files coming out of the rake-off are sorted on their respective key fields. There is a different sorted extract file for every year's worth of data.

Step 214—Merge the sorted extracted files.

Each set of files for all years' worth of data is merged together into a single file for each of the extracted rake-off file types.

Step 216—Summarize the merged extract files.

All the sorted rake-off file types with the exception of the batter rake-off are each, in turn, summarized over the specified key fields to provide counts of the occurrences within the subordinate fields.

The batter rake-off file is treated in somewhat different manner then the others in that it is sorted into three separate sequences to produce three separate summarized files as defined below. They are all summarized over the fields indicated to be key fields providing counts of the occurrences within each of the subordinate fields.

a) The batter summarized detail is defined by:
   the batter number (key field),
   the batter hand code (key field),
   the pitcher hand code (key field),
   the count (key field),
   the base situation (key field),
   the type of pitch (key field),
   the location of the pitch (key field),
   counts for each possible call of pitch, and
   counts for each possible type of hit.
b) The ERA summarized detail is defined by:
   the pitcher number (key field),
   the pitcher hand code (key field),
   the batter hand code (key field),
   the count (key field),
   the type of pitch (key field),
   the location of the pitch (key field),
   counts for each possible call of pitch, and
   counts for each possible type of hit.
c) The hitter summarized detail is defined by:
   the batter number (key field),
   the batter hand code (key field),
   the pitcher number (key field),
   the pitcher hand code (key field),
   the stadium code (key field),
   and for each of the possible 28 quadrants
      1) counts of no bases gained,
      2) counts of one base gained,
      3) counts of two bases gained,
      4) counts of three bases gained, and
      5) counts of four bases gained Each sorted output file is summarized over the key fields within their record definition to generate summarized counts of each subordinate field's possible occurrences.

Step 218—Load the summarized files into VSAM databases.

All summarized files are loaded into VSAM databases to allow random access to this information from the simulation program.

GAME SIMULATION SETUP

Figure 3A:
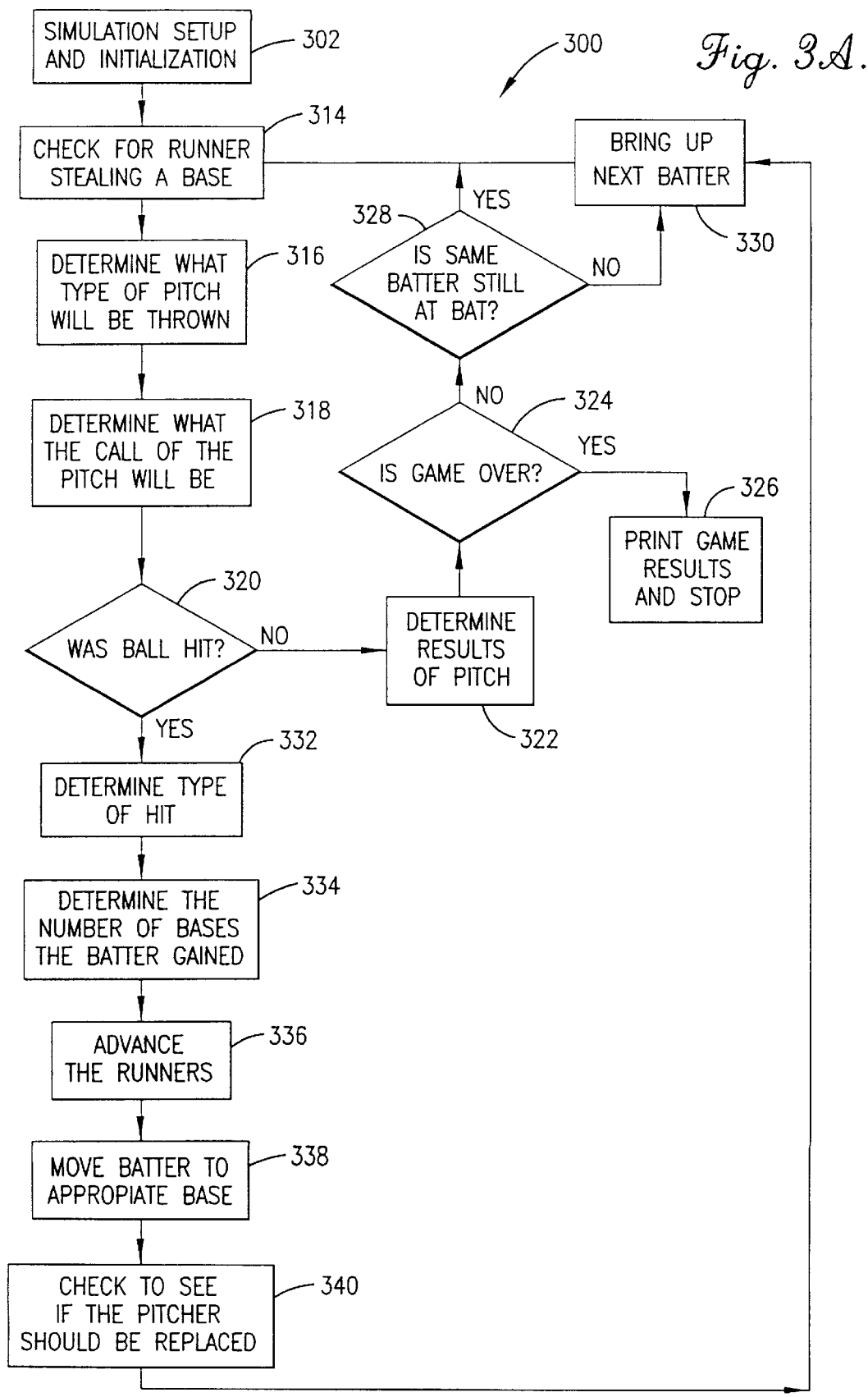
FIG. 3A is a computer program flow chart illustrating the game simulation portion of the preferred computer program in accordance with the present invention for operating the computer of FIG. 1.
Figure 3B:
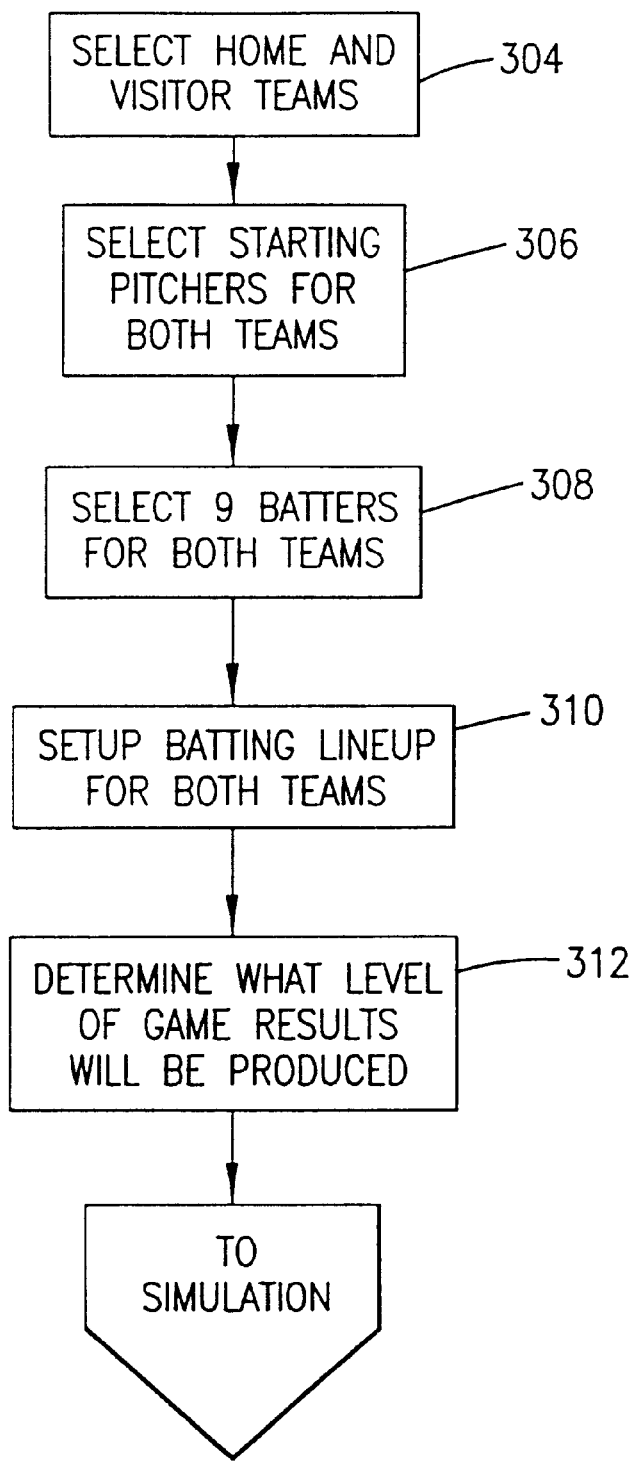
FIG. 3B is a computer program flow chart illustrating the simulation setup of FIG. 3A.

FIG. 3A is a flow chart illustrating the game simulation portion 300 of the preferred computer program of the present invention. Portion 300 starts at step 302 for simulation setup and initialization. FIG. 3B is a flow chart illustrating the simulation setup which begins at step 304.

The game simulation setup is the client interface into the simulation via the internet. It will lead the client through a choice of competing teams, their starting pitchers, batters, and lineup. Also, completion of the setup creates the ten data files illustrated in FIG. 1. These files organize the data needed by the simulation.

Step 304—Select home and visitor teams.

To setup the simulation, a home team and a visitor team must be selected from a list of all of the major league teams.

Step 306—Select starting pitchers for both teams.

After the teams have been selected, a starting pitcher must be selected for both teams from a list of all available pitchers on each respective team.

Step 308—Select nine batters for both teams.

The next step involves selecting nine batters for each team. These batters are selected from a list of all available batters for each respective team.

Step 310—Setup batting lineup for both teams.

After the batters have been selected, the batting order for each team must be established. Each batter is assigned a number between 1 and 9, and would include the designated hitter for American league teams.

Step 312—Determine what level of game results will be produced.

The client or user then determines the desired level of detail in the reported game results. There are 3 levels of game results from which the user can choose including any combination of the following:

1) Box score includes a table of each batter, his number of times at bat, hits, rbi's, and runs scored. It also contains the number of innings each pitcher pitched along with his statistics on the number of hits, runs scored, walks, and strike outs. Finally, an inning by inning account of the scoring for the game.

2) Scoring summary includes a summary of all innings in which a score took place, describing how the batters got on base and how the runners advanced during the inning.

3) Detailed pitch by pitch includes an elaborate pitch by pitch detailed account of the game including the results of every event in the game.

The report describes every detail of a pitch, every detail of a hit, including how the ball was fielded, and every detail of runner advancement.

GAME SIMULATION

After a client has completed the setup for a simulation (steps 304–312), the game is completely simulated by the computer as illustrated in FIG. 3A. The simulation program uses a randomizing technique against the past years' worth of historical data to determine what has occurred in the past.

Step 302—Simulation setup and initialization

The setup portion of this step is illustrated by steps 304–312 of FIG. 3B described above. Step 302 then completes the initialization portion that creates an initial random seed by using the current time of day (in seconds) divided by 86400 and the quotient multiplied by 259199. This initial seed is used to start the randomizing routine used in the simulation as described further herein.

Step 314—Check for runner stealing base

Before each pitch is thrown, the simulation then checks to see if there is a runner on base. If so, the simulation reads 16 stealer records for this runner. These records are used to determine how many times this runner has been on this base, how many times this runner has attempted to steal from this base, and how many times this runner successfully stole from this base.

A dynamic weighting factor is then applied to all of the above totals. A random number is generated to provide a percent that is multiplied by the total of all counters above, the random percent then determines whether the runner will attempt to steal and if so whether or not the steal will be successful. If the runner steals a base, he is advanced to the next base.

In more detail, there are six different types of records that receive a weighting factor in the weighting system. The records are batter, pitch location, hitter, runner, stealer and pitcher.

The batter records are used to determine which of the following occurred: ball, strike, hit, foul, ball, bunt, or hit by pitch and if a hit, what type of hit it was.

The pitch location records are used to determine the type of pitch that will be thrown and the location that the pitch will be thrown into.

The hitter records are used after we have determined that the batter hit the ball, to determine which one of twenty-eight quadrants the ball was hit to and also how many bases the batter advanced.

The runner records are used to determine how many bases a runner, who is already on a base, can advance based on the type of hit and the quadrant that the ball was hit into.

The stealer records are used to determine whether or not a runner will steal a base on any given pitch.

The pitcher records are used to determine the most likely pitcher to bring into the game when the pitcher needs to be replaced. This is based on who was brought in the most in this exact location in the past.

The simulation program uses two different methods for weighting the above records. The first is a dynamic weighting system that is completely self-contained within the program. This weighting system will favor specific individual performance over that of general combined data from multiple players and will do it dynamically varying the amount of weighting by the amount of actual data.

The second weighting system is used in conjunction with the first and is a manual weighting system in which we can add an additional weighting factor to the dynamic weighting factor. This manual weighting factor can be changed at any time allowing specific records to receive a heavier weighting.

The following is a break down of each file and how the records are used in the weighting system:

The stealer file uses sixteen records to determine whether or not a runner on base will steal on any given pitch. These records are weighted in the following order from left to right:

| 1 | 2 | 3 | 4 | 5 | 6 | 7 | 8 | 9 | 10 | 11 | 12 | 13 | 14 | 15 | 16 | Record Number |
|---|---|---|---|---|---|---|---|---|----|----|----|----|----|----|----|---------------|
| S | S | S | S | S | S | S | S | 9 | 9  | 9  | 9  | 9  | 9  | 9  | 9  | Stealer Line  |
| P | P | P | P | 9 | 9 | 9 | 9 | P | P  | P  | P  | 9  | 9  | 9  | 9  | Pitcher Line  |
| F | F | 9 | 9 | F | F | 9 | 9 | F | F  | 9  | 9  | F  | F  | 9  | 9  | Stadium Line  |
| O | 9 | O | 9 | O | 9 | O | 9 | O | 9  | O  | 9  | O  | 9  | O  | 9  | Outs Line     |

Where S is the specific stealer, P is the specific pitcher, F is the specific stadium, and O is the specific number of outs. The 9's in the above table represent all data in that category.

The entries (S, P, F, O and 9) represent the circumstances of the game playing characteristics for the team member of the record. Records 1–8 include data of the specific team member's past performance under the indicated circumstances. The circumstances are most detailed for record 1 and the least detailed for record 8. Records 9–16 include data of all team members in the data base with record 9 under the most detailed circumstances and record 16 under the least detailed circumstances.

As an example, record 1 might indicate that this particular team member has attempted to steal under the indicated circumstances five times and was successful two times.

Thus, record 1 provides characteristics data representative of the game-playing characteristics of the team member under the indicated circumstances. In contrast, record 8 includes the characteristics data for the team member under the more general circumstances. For example, this team member may have attempted 40 total steals and was successful 15 times.

The steal file for the particular team member also includes characteristics data for all of the team members in the data base as records 9–16 also varying from the most detailed or specific of record 9 to the least detailed or more general circumstances of record 16. Thus, an individual team member's steal record also includes the characteristics of other team members in the data base. In this way, data is available for use in the simulation even if little detail is available for a particular team member. For example, a new team member recently called up from the minor leagues will have little or no detail available in the steal file. Accordingly, the simulation used the data from all team members for this new member. The other records described below are similarly arranged.

The batter file uses 16 records to determine what will occur with each pitch that is thrown. These records are weighted in the following order from left to right:

Where B is the specific batter, P is the specific pitcher, S is the specific stadium, and G is the specific general situation which is made up of outs, count, and base situation. The 9's in the above table represent all data in that category.

The pitch location file uses sixteen records to determine what type and location of pitch will be thrown. These records are weighted in the following order from left to right:

| 1 | 2 | 3 | 4 | 5 | 6 | 7 | 8 | 9 | 10 | 11 | 12 | 13 | 14 | 15 | 16 | Record Number |
|---|---|---|---|---|---|---|---|---|----|----|----|----|----|----|----|---------------|
| P | P | P | P | P | P | P | P | 9 | 9  | 9  | 9  | 9  | 9  | 9  | 9  | Pitcher Line |
| B | B | B | B | 9 | 9 | 9 | 9 | B | B  | B  | B  | 9  | 9  | 9  | 9  | Batter Hand Line |
| C | C | 9 | 9 | C | C | 9 | 9 | C | C  | 9  | 9  | C  | C  | 9  | 9  | Count Line |
| S | 9 | S | 9 | S | 9 | S | 9 | S | 9  | S  | 9  | S  | 9  | S  | 9  | Base Situation Line |

Where P is the specific pitcher, B is the specific batter hand, C is the specific count, and S is the specific base situation. The 9's in the above table represent all data in that category.

The hitter file uses sixteen records to determine what quadrant the ball was hit into and how many bases will be gained by the batter. These records are weighted in the following order from left to right:

| 1 | 2 | 3 | 4 | 5 | 6 | 7 | 8 | 9 | 10 | 11 | 12 | 13 | 14 | 15 | 16 | Record Number |
|---|---|---|---|---|---|---|---|---|----|----|----|----|----|----|----|---------------|
| B | B | B | B | B | B | B | B | 9 | 9  | 9  | 9  | 9  | 9  | 9  | 9  | Batter Line |
| P | P | P | P | 9 | 9 | 9 | 9 | P | P  | P  | P  | 9  | 9  | 9  | 9  | Pitcher Line |
| S | S | 9 | 9 | S | S | 9 | 9 | S | S  | 9  | 9  | S  | S  | 9  | 9  | Stadium Line |
| T | 9 | T | 9 | T | 9 | T | 9 | T | 9  | T  | 9  | T  | 9  | T  | 9  | Type of Hit Line |

Where B is the specific batter, P is the specific pitcher, S is the specific stadium, and T is the specific type of hit. The 9's in the above table represent all data in that category.

The runner file uses 16 records to determine exactly how the runners will advance when the ball is hit. These records are weighted in the following order from left to right:

| 1 | 2 | 3 | 4 | 5 | 6 | 7 | 8 | 9 | 10 | 11 | 12 | 13 | 14 | 15 | 16 | Record Number |
|---|---|---|---|---|---|---|---|---|----|----|----|----|----|----|----|---------------|
| B | B | B | B | B | B | B | B | 9 | 9  | 9  | 9  | 9  | 9  | 9  | 9  | Batter Line |
| P | P | P | P | 9 | 9 | 9 | 9 | P | P  | P  | P  | 9  | 9  | 9  | 9  | Pitcher Line |
| S | S | 9 | 9 | S | S | 9 | 9 | S | S  | 9  | 9  | S  | S  | 9  | 9  | Stadium Line |
| G | 9 | G | 9 | G | 9 | G | 9 | G | 9  | G  | 9  | G  | 9  | G  | 9  | General Situation Line |

| 1 | 2 | 3 | 4 | 5 | 6 | 7 | 8 | 9 | 10 | 11 | 12 | 13 | 14 | 15 | 16 | Record Number |
|---|---|---|---|---|---|---|---|---|----|----|----|----|----|----|----|---------------|
| R | R | R | R | R | R | R | R | 9 | 9  | 9  | 9  | 9  | 9  | 9  | 9  | Runner Line |
| S | S | S | S | 9 | 9 | 9 | 9 | S | S  | S  | S  | 9  | 9  | 9  | 9  | Stadium Line |
| Q | Q | 9 | 9 | Q | Q | 9 | 9 | Q | Q  | 9  | 9  | Q  | Q  | 9  | 9  | Quadrant Line |
| G | 9 | G | 9 | G | 9 | G | 9 | G | 9  | G  | 9  | G  | 9  | G  | 9  | General Situation Line |

Where R is the specific runner, S is the specific stadium, Q is the specific quadrant, and G is the specific general situation, which is made up of outs, base situation and type of hit. The 9's in the above table represent all data in that category.

Step 316—Determines what type of pitch will be thrown.

To determine the type of pitch that will be thrown, the simulation looks at the current ball and strike count on the batter and also the base situation. Based on these items, the simulation reads the Pitch Location File and builds a table of the nine different types of pitches and nine different locations that it can be thrown into. The simulation then generates a random number that is multiplied against the total number of all kinds of pitches. This produces a percentage of the total used to determine what the type of pitch will be and where it will be thrown.

| Types of pitches | Location of pitches |
|------------------|---------------------|
| Fast Ball        | High Outside        |
| Curve Ball       | High over the Middle |
| Slider           | High Inside         |
| Screw Ball       | Medium Outside      |
| Knuckle Ball     | Medium over the Middle |
| Sinker           | Medium Inside       |
| Change up/curve  | Low Outside         |
| Intentional ball | Low over the Middle |
| Change up/fast ball | Low Inside       |

Step 318—Determines the call of the pitch.

After the type of pitch and location of the pitch is determined, this information is used to determine what the call of the pitch will be. The call of the pitch is determined using the following tables:

| Call | Type of Hit |
|------|-------------|
| Hit  | Ground Ball |
| Fowl Ball | Line Drive |
| Strike Swing | Fly Ball |
| Strike No Swing | |
| Ball | |
| Pitch-out | |
| Walk | |
| Ball | |
| Bunt | |
| Bunt Attempt | |
| Hit by Pitch | |
| Wild-pitch | |
| Passed ball | |

To determine the call, the simulation reads 16 batter records that have a count of how many times the above items have occurred based on what the type and location of the pitch was. It then applies a dynamic weighting factor to all totals.

The simulation then reads the pitcher record for this situation and determines how he compares to all other pitchers in the league in this same situation. His ERA is then computed based on a percentage of his rating against all other pitchers, where 1.0 is the norm, less than 1.0 is below average, and greater than 1.0 is above average.

The batter's hits are then adjusted by the ERA percentage by multiplying it by the batter's hits. The batter's total hits are also adjusted by a percentage of how he does based on the number of times he has been to bat, time of the season, and home field advantage.

The simulation next reads the player master file to retrieve the percentages for this player in these areas which is then used as multiplier against his hits. This will increase or decrease his hits based on these situations. The simulation will then generate a random number that is multiplied by the total counts in all fields above. This is then used as a percentage to determine what the call will be and, if it is a hit, what the type of hit will be.

Step 322—Determines the results of the pitch.

After step 318, step 320 asks whether the ball was hit. If the answer is no, step 322 then determines the no-hit results of the pitch. If the call is a ball, the simulation increments the number of balls by one and checks to see if the batter has four balls. If so, the batter has walked and will be moved to first base, the next batter in the lineup will then be brought up to bat.

If the call is a strike, the simulation increments the number of strikes by one and checks to see if the batter has three strikes. If so, the batter has struck out and the number of outs will be incremented by one. If the number of outs is less than three, the next batter in the lineup will be brought up to bat. Otherwise, the batting team will go to the field and the fielding team will come up to bat.

If the call is a foul, the simulation checks to see if the ball was caught. If yes, the batter is out and the number of outs are incremented by one. If the number of outs is less than three, the next batter in the lineup is brought up to bat. Otherwise, the batting team will go to the field and the fielding team will come up to bat.

If the foul ball was not caught and the number of strikes is less than two, the number of strikes will be incremented by one. If the number of strikes is equal to two the next pitch will be thrown with no change to the count.

If the call is a ball, and it is the fourth ball, the batter is advanced to first and affected base runners are advanced, and the next pitch thrown. If the call is a "pitch out," the results are treated like a ball.

If the call is a "hit by a pitch," the batter moves to first base and any other runner advance if there is already a runner on first base. The next batter in the lineup then bats. If the call is a "wild pitch," the simulation determines if any runners on base will advance and the batter results are treated like a ball.

Steps 324, 326, 328 and 330

After each pitch, step 324 determines whether the game is over, that is, whether nine or more innings have been played and the score is not tied. If yes, the program, in step 326, prints the game results as specified by the user and the program ends. When the game is over, the simulation will produces up to three reports as selected by the user including box score of the game, a summary of all innings in which a run was scored, and detailed pitch by pitch account of the entire game.

If the game is not over, the answer in step 324 is no and step 328 determines whether the same batter is still at bat. If no, step 330 brings up the next batter. If the answer in step 328 is yes, or after step 330, the program returns to step 314.

Step 332—Determines the type of hit.

If the call of the pitch is a hit, the simulation determines the type of hit and the field location of the hit ball.

Step 334—Determines the number of bases the batter gained.

To determine the number of bases gained for the batter, the simulation reads the eight hitter records that identify what has happened in the past when the ball has been hit to one of the twenty-eight quadrants on the field. The simulation then generates a random number that is used as a multiplier against the total number of bases gained for this specific quadrant. This identifies how many bases the batter will advance. The number will be 0 for no bases gained, 1 for first base, 2 for second base, 3 for 3rd base and 4 for a home run.

Step 336—Advance the runners.

Based on where the ball was hit and the number of bases that the batter gained, the simulation reads the sixteen runner records of each of the other base runners. These records identify how many bases were gained in the past in this specific situation. The simulation generates a random number used as a multiplier against the total bases gained to determine how each runner will advance. Each runner is then moved to the appropriate base.

Step 338—Move the batter to appropriate base.

Move the batter to the base specified by the number of bases gained.

Step 340—Check to see if the pitcher should be replaced.

A check is made after every hit to determine if the pitcher should be replaced. There are several conditions that can cause a pitcher to be replaced as follows:

1) If the starting pitcher has thrown at least 100 pitches and they are behind by three of more runs, the pitcher is replaced.
2) If the game is past the sixth inning and the fielding team is losing, the starting pitcher will be replaced.
3) If the opposing team has scored more than four runs in a single inning, replace the starting pitcher.
4) If the inning is less than 8 and the relief pitcher has allowed three runs to score in this inning, replace the relief pitcher.
5) If the inning is greater than 7 and the batting team is 3 or less runs ahead, then replace the relief pitcher.
6) If the inning is greater than 7 and the batting team is ahead replace the relief pitcher.
7) If the inning is greater than 7 and the relief pitcher has allowed two runs to score, replace the relief pitcher.

To replace the pitcher, the simulation reads the pitcher file for this team and loads a table with the total number of times each pitcher on the team has come into the game in this inning and this situation. A random number is then generated that is used as a multiplier against the total which will determine which pitcher has been brought in the most in this inning and situation in the past. That is the pitcher that will be selected. The program then moves to step 330 as described above.

Those skilled in the art will appreciate that the present invention encompasses many variations in the preferred embodiment described herein. Having thus described this embodiment, the following is claimed as new and desired to be secured by letters patent:

What is claimed is:

1. A game simulation computer program stored on a computer-readable medium for operating a computer to simulate the playing of an athletic game between opposing teams having team members, said program comprising:

retrieving means for retrieving characteristics data representative of the game-playing characteristics of each team member under selected circumstances;

simulation means for simulating the sequential game play events of the game according to the rules thereof;

outcome means for determining the respective outcomes of said events in accordance with said characteristics data; and tracking means for tracking the progress of the game in accordance with said outcomes through completion of said events thereby simulating the playing of the game to its conclusion.

2. The program as set forth in claim 1, the athletic game including a baseball game.

3. The program as set forth in claim 1, said characteristics data being representative of the historical characteristics of each team member under known prior circumstances.

4. The program as set forth in claim 1, said events including the scoring of points by the teams, said tracking means including means for tracking said scoring in order to produce a game score including a final score to determine a winner of the game.

5. The program as set forth in claim 1, said characteristics data including a plurality of team member records for each team member, said records being representative of game playing characteristics for the associated team member under different ones of said selected circumstances.

6. The program as set forth in claim 5, said records being configured in progression from less detailed to more detailed of said circumstances.

7. The program as set forth in claim 6, said records further including other player records representative of the game playing characteristics of other players of said game configured in progression from less detailed to more detailed of said circumstances.

8. The program as set forth in claim 5, said outcome means including means for determining the outcome of an event involving an individual team member in accordance with the team member records thereof.

9. The program as set forth in claim 8, said outcome means including means for determining the outcome of an event involving an individual team member in accordance with a dynamic weighting factor applied to team member records thereof.

10. The program as set forth in claim 8, said outcome means including means for determining the outcome of an event involving an individual team member in accordance with a dynamic weighting factor and random number percentage applied to team member records thereof.

11. The program as set forth in claim 1, said athletic game including a baseball game, said events including all in-play pitches in sequence, said outcomes including the scoring of points by the teams, said tracking means including means for tracking said scoring in order to produce a game score including a final score to determine a winner of the game, said characteristics data being representative of the historical characteristics of each team member under known prior circumstances and including a plurality of team member records for each team member including individual records representative of game playing characteristics for the associated team member under different ones of said selected circumstances and being configured in progression from less detailed to more detailed of said circumstances, and other player records representative of the game playing characteristics of other players of said game under the same circumstances as said individual records, said outcome means including means for determining the outcome of an event involving an individual team member in accordance with a dynamic weighting factor and random number percentage applied to team member records thereof.

12. The program as set forth in claim 11, said events further including at least one of a team replacing a pitcher with another pitcher, an attempt to steal a base, type and location of the pitch, call of the pitch, type of hit and where it lands on the field, and the advancement of all base runners.

13. The program as set forth in claim 11, said events further including at least one of a type and location of the pitch, call of the pitch, type of hit and where it lands on the field, and the advancement of all base runners.

14. A game simulation computer operated by a game simulation computer program stored on a computer-readable medium for simulating the playing of an athletic game between opposing teams having team members, said computer comprising:

retrieving means for retrieving characteristics data representative of the game-playing characteristics of each team member under selected circumstances;

simulation means for simulating the sequential game play events of the game according to the rules thereof;

outcome means for determining the respective outcomes of said events in accordance with said characteristics data; and tracking means for tracking the progress of the game in accordance with said outcomes through completion of said events thereby simulating the playing of the game to its conclusion.

15. A computer program stored on a computer readable memory device for directing operation of a computer in the simulation of an athletic game, the computer program comprising:

a code segment for receiving and storing data on the memory device corresponding to a plurality of different historical game playing event characteristics of each of a plurality of athletic players;

a code segment for receiving instructions from at least one game player for selection of said data corresponding to at least some of said plurality of athletic players received and stored by the memory device to participate in a computer-simulated game;

a code segment for, in response to the selection instructions from the game player, processing said data to generate all of the game events necessary to simulate the athletic game without requiring any game player interaction after receiving the selection instructions from the at least one game player; and a code segment for providing a report of simulated game results generated by the processing code segment including at least some of the series of sequential simulated game events.

16. A computer program as set forth in claim 15, wherein the code segment for processing generates said series of sequential simulated game events from data received and stored by said code segment for receiving and storing without game player interaction.

17. A computer program as set forth in claim 15, further including a code segment for automatically comparing the simulated game events generated by said processing code segment to predetermined substitution criteria during said processing of the data by said processing code segment, the comparison being conducted in order to determine whether to substitute historical game playing event characteristics corresponding to another athletic player on which the data has been received and stored for the data of one of the athletic players selected by said game player.

18. A computer program as set forth in claim 15, further including a code segment for receiving game player instructions corresponding to a level of detail to be provided by the code segment for reporting and providing the level of detail instructions to the reporting code segment for providing a report corresponding to the level of detail instructions.

19. A computer program as set forth in claim 15, wherein said code segment for processing accesses and compares data corresponding to historical game playing event characteristics of different athletic players to generate said sequential simulated game events.

20. A computer program as set forth in claim 15, wherein said athletic game is baseball, said code segment for receiving and storing data receives and stores historical athletic player data corresponding to a first plurality of batters and at least one pitcher comprising a first simulated team and a second plurality of batters and at least another pitcher comprising a second simulated team, wherein said code segment for receiving instructions enables selection by the game player of the membership of a first lineup from the batters and at least one pitcher of said first simulated team and second lineup from the batters and at least one pitcher of the second simulated team and identification of which of the first simulated and second simulated team will be identified as the home team, and wherein the code segment for processing selects historical athletic player data from the players of each said first and second lineups using random number generation and performance weighting criteria to generate the sequential simulated game events without intervening game player instructions.

21. A computer-implemented method of providing a simulated outcome of an athletic game comprising the steps of:

receiving and storing data in a computer corresponding to a plurality of different historical game playing event characteristics of each of a plurality of athletic players;

receiving instructions in the computer from at least one game player for selection of said data corresponding to at least some of said plurality of athletic players to participate in a computer-simulated game;

processing said data with the computer to generate all of the game events necessary to simulate the athletic game without requiring any game player interaction after receiving the selection instructions from the at least one game player; and providing a report of simulated game results including at least some of the series of sequential simulated game events.

22. A computer-implemented method of providing a simulated outcome of an athletic game as set forth in claim 21 further comprising the step of generating said series of sequential simulated game events from the selected stored data and without game player interaction.

23. A computer-implemented method of providing a simulated outcome of an athletic game as set forth in claim 21 further comprising the step of automatically comparing the simulated game events during to predetermined substitution criteria stored by the computer during said processing step to determine whether to substitute another athletic player on which data has been received and stored for one of the athletic players selected by said game player.

24. A computer-implemented method of providing a simulated outcome of an athletic game as set forth in claim 21 further comprising the step of receiving game player instructions corresponding to the level of detail to be provided in said reporting step.

25. A computer-implemented method of providing a simulated outcome of an athletic game as set forth in claim 21 further comprising the step of accessing and comparing data corresponding to historical game playing event characteristics of different athletic players to generate said sequential simulated game events.

26. A computer-implemented method of providing a simulated outcome of an athletic game as set forth in claim 21, wherein said athletic game is baseball, and further comprising the steps of receiving and storing historical athletic player data corresponding to a first plurality of batters and at least one pitcher comprising a first simulated team and a second plurality of batters and at least another pitcher comprising a second simulated team, selection by the game player of the membership of a first lineup from the batters and at least one pitcher of said first simulated team and second lineup from the batters and at least one pitcher of the second simulated team and identification of which of the first simulated and second simulated team will be identified as the home team, and selecting historical athletic player data from the players of each said first and second lineups using random number generation and performance weighting criteria to generate the sequential simulated game events without intervening game player instructions.

27. Data relating to a computer simulated athletic game created by the method comprising the steps of:
   receiving and storing data corresponding to a plurality of different historical game playing event characteristics of each of a plurality of athletic players;
   receiving instructions from at least one game player for selection of said data corresponding to at least some of said plurality of athletic players to participate in a computer-simulated game;
   processing said data to generate all of the game events necessary to simulate the athletic game without requiring any game player interaction after receiving the selection instructions from the at least one game player; and
   providing a report of simulated game results including at least some of the series of sequential simulated game events.

28. Data relating to a computer simulated athletic game as set forth in claim 27 and further created by the method including the step of generating said series of sequential simulated game events from the selected stored data and without game player interaction.

29. Data relating to a computer simulated athletic game as set forth in claim 27 and further created by the method including the step of automatically comparing the simulated game events during to predetermined substitution criteria stored by the computer during said processing step to determine whether to substitute another athletic player on which data has been received and stored for one of the athletic players selected by said game player.

30. Data relating to a computer simulated athletic game as set forth in claim 27 and further created by the method including the step of receiving game player instructions corresponding to the level of detail to be provided by said reporting step.

31. Data relating to a computer simulated athletic game as set forth in claim 27 and further created by the method including the step of accessing and comparing data corresponding to historical game playing event characteristics of different athletic players to generate said sequential simulated game events.

32. Data relating to a computer simulated athletic game as set forth in claim 27 and further created by the method including the steps of receiving and storing historical athletic player data corresponding to a first plurality of batters and at least one pitcher comprising a first simulated team and a second plurality of batters and at least another pitcher comprising a second simulated team, selection by the game player of the membership of a first lineup from the batters and at least one pitcher of said first simulated team and second lineup from the batters and at least one pitcher of the second simulated team and identification of which of the first simulated and second simulated team will be identified as the home team, and selecting historical athletic player data from the players of each said first and second lineups using random number generation and performance weighting criteria to generate the sequential simulated game events without intervening game player instructions.

33. A computer system for operating a simulated computer-generated simulated athletic game, the system comprising:
   a host computer; and
   a plurality of user computers operatively connected to the host computer via a communications network,
   the host computer being programmed to:
      receive and store data corresponding to a plurality of different historical game playing event characteristics of each of a plurality of athletic players;
      receive instructions from at least one game player for selection of said data corresponding to at least some of said plurality of athletic players to participate in a computer-simulated game;
      process said data to generate all of the game events necessary to simulate the athletic game without requiring any game player interaction after receiving the selection instructions from the at least one game player; and
      provide a report of simulated game results including at least some of the series of sequential simulated game events.

34. A computer system as set forth in claim 33, wherein the host computer is further programmed to generate said series of sequential simulated game events from the selected stored data and without game player interaction.

35. A computer system as set forth in claim 33, where in the host computer is further programmed to automatically compare the simulated game events to predetermined substitution criteria stored by the computer during the processing of said data to determine whether to substitute another athletic player on which data has been received and stored for one of the athletic players selected by the game player.

36. A computer system as set forth in claim 33, wherein the host computer is further programmed to receive game player instructions corresponding to the level of said sequential simulated game events to be reported.

37. A computer system as set forth in claim 33, wherein the host computer is further programmed to access and compare data corresponding to historical game playing event characteristics of different athletic players to generate said sequential simulated game events.

38. A computer system as set forth in claim 33, wherein the host computer is further programmed to receive and store historical athletic player data corresponding to a first plurality of batters and at least one pitcher comprising a first simulated team and a second plurality of batters and at least another pitcher comprising a second simulated team, to receive selection instructions by the game player of the membership of a first lineup from the batters and at least one pitcher of said first simulated team and second lineup from the batters and at least one pitcher of the second simulated team and identification of which of the first simulated and second simulated team will be identified as the home team, and to select historical athletic player data from the players of each said first and second lineups using random number generation and performance weighting criteria to generate the sequential simulated game events without intervening game player instructions.

\* \* \* \* \*